(12) United States Patent
He et al.

(10) Patent No.: US 12,025,886 B2
(45) Date of Patent: Jul. 2, 2024

(54) DISPLAY PANEL, METHOD OF MANUFACTURING DISPLAY PANEL, AND DISPLAY DEVICE

(71) Applicant: HKC CORPORATION LIMITED, Shenzhen (CN)

(72) Inventors: Hailong He, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/092,205

(22) Filed: Dec. 30, 2022

(65) Prior Publication Data

US 2024/0094581 A1 Mar. 21, 2024

(30) Foreign Application Priority Data

Sep. 20, 2022 (CN) .......................... 202211145407.4

(51) Int. Cl.
*G02F 1/1339* (2006.01)
*G02F 1/1333* (2006.01)
*G02F 1/1335* (2006.01)
*G02F 1/1345* (2006.01)

(52) U.S. Cl.
CPC ........ *G02F 1/1339* (2013.01); *G02F 1/13332* (2021.01); *G02F 1/133354* (2021.01); *G02F 1/133528* (2013.01); *G02F 1/13452* (2013.01); G02F 2201/07 (2013.01); G02F 2202/28 (2013.01); G02F 2202/36 (2013.01)

(58) Field of Classification Search
CPC .......... G02F 1/133308–133331; G02F 1/1339; G02F 1/133528; G02F 1/13354
See application file for complete search history.

(56) References Cited

U.S. PATENT DOCUMENTS

| 2001/0045712 A1 | 11/2001 | Mathew et al. |
| 2017/0147036 A1 | 5/2017 | Mathew et al. |
| 2018/0231834 A1 | 8/2018 | Chen et al. |

FOREIGN PATENT DOCUMENTS

| CN | 105301848 A | | 2/2016 |
| CN | 106547140 A | | 3/2017 |
| CN | 206863396 U | | 1/2018 |
| CN | 108153069 A | | 6/2018 |
| CN | 113193136 A | | 7/2021 |
| CN | 113419373 A | * | 9/2021 |
| CN | 113555412 A | | 10/2021 |
| CN | 113674622 A | | 11/2021 |
| CN | 113721381 A | | 11/2021 |
| DE | 19952175 A1 | | 10/2000 |

(Continued)

*Primary Examiner* — Mariceli Santiago
(74) *Attorney, Agent, or Firm* — Franklin & Associates International Inc; Matthew F. Lambrinos

(57) ABSTRACT

The disclosure relates to a display panel, a method of manufacturing a display panel, and a display device. The display panel includes a first polarizer, an array substrate and a color film substrate that are sequentially stacked. The array substrate includes a binding region. A first sealing adhesive is filled between the binding region and the first polarizer, covers an end of a flexible circuit board away from a mainboard, and covers the binding region, which avoids using a decorative member, reduces a wide frame of a fourth side of the display panel, and increases a real frameless display effect.

18 Claims, 4 Drawing Sheets

(56) References Cited

FOREIGN PATENT DOCUMENTS

| | | | |
|---|---|---|---|
| JP | 2001117077 A | | 4/2001 |
| KR | 20130131692 A | | 12/2013 |
| KR | 20150079284 A | * | 7/2015 |
| KR | 20170004086 A | | 1/2017 |

* cited by examiner

DISPLAY PANEL, METHOD OF MANUFACTURING DISPLAY PANEL, AND DISPLAY DEVICE

CROSS-REFERENCE TO RELATED APPLICATIONS

The present application claims priority under 35 U.S.C. § 119 to Chinese patent application No. 202211145407.4 filed on Sep. 20, 2022 before the China National Intellectual Property Administration of the People's Republic of China, entitled "Display Panel, Method of Manufacturing Display Panel, and Display Device", the contents of which are explicitly incorporated herein by reference in their entirety.

FIELD

The disclosure relates to the technical field of display panels, in particular to a display panel, a method of manufacturing a display panel, and a display device.

BACKGROUND

At present, displays tend to be developed into frameless displays. The present display adopts a design of stacked multilayer panels, which makes the display thinner and lighter. In order not to increase an overall thickness of the display after being set with stacked panels, when lines are to be set, a drive circuit can only be bound on one side of a display panel instead of setting the lines behind the single panel or setting the lines to avoid the display panel. As a result, a relatively large region on one side of the existing display panel is generated, which affects aesthetics. In addition, light leaks from an edge of the panel due to a fact that the thin and lightweight panel cannot completely block a light source.

In the related art, a circuit region and a part of a screen panel are covered by setting a decorative member on a fourth side to achieve the purpose of beautification and light-leakage prevention. However, the setting leads to a wide frame of the fourth side, and the decorative member may protrude, thereby lacking a real frameless effect and seriously affecting experience of a user.

SUMMARY

The disclosure aims to provide a display panel, a method of manufacturing a display panel, and a display device in order to solve the problems in the related art that a binding region needs to be covered by a decorative member to cause a wide frame of the fourth side of the display panel, and the frame protrudes to lack a real frameless effect.

In a first aspect, the disclosure provides a display panel comprising an array substrate and a color film substrate that are disposed opposite, and a first polarizer on a side of the color film substrate away from the array substrate, in which the array substrate comprises a display region and a binding region on a side of the display region, the binding region is electrically connected to a mainboard through a flexible circuit board, and an orthographic projection of the color film substrate on the array substrate does not overlap with the binding region, the display panel further comprising: a first sealing adhesive filled between the binding region and the first polarizer and covering an end of the flexible circuit board away from the mainboard, in which an area of an orthographic projection of the first polarizer on the array substrate is larger than an area of the array substrate.

In a second aspect, the disclosure provides a method of manufacturing a display panel, comprising: aligning an array substrate with a color film substrate and performing bonding operation in a binding region in order to electrically connect the binding region to a mainboard through a flexible circuit board; applying a first sealing adhesive to the binding region, in which the first sealing adhesive covers an end of the flexible circuit board away from the mainboard; and attaching a first polarizer to the color film substrate and the first sealing adhesive to form a semi-finished product, in which an area of an orthographic projection of the first polarizer on the array substrate is larger than an area of the array substrate.

In a third aspect, the disclosure provides a display device comprising: a display panel; a backlight module provided on a backlight side of the display panel and configured to provide a light source for the display panel, in which the flexible circuit board and the mainboard are bent from an end of the display panel to a backlight surface of the backlight module; and a front frame provided on sides of the display panel and the backlight module and covering the flexible circuit board, in which the front frame does not overlap with a first polarizer of the display panel.

According to the display panel, the method of manufacturing a display panel, and the display device provided by embodiments of the disclosure, the display panel covers and incorporates the binding region under the first polarizer by setting the first sealing adhesive, so that the binding region is covered by the first polarizer and the first sealing adhesive can effectively prevent light leakage. Therefore, the problems in the related art are effectively solved, comprising the wide frame of the fourth side of the display panel, which is caused by that the binding region is required to be covered by a decorative member, and the lack of a real frameless effect due to the protruding frame.

BRIEF DESCRIPTION OF THE DRAWINGS

Features, advantages and technical effects of exemplary embodiments of the disclosure will be described below with reference to the accompanying drawings. In the drawings, identical components are denoted by the same reference numerals. The drawings are not drawn to scale, and are merely intended to illustrate a relative positional relationship, thicknesses of some portions are exaggerated for clarity, and thicknesses in the drawings are not intended to represent a proportional relationship of actual thicknesses.

DESCRIPTION OF REFERENCE NUMERALS

Figure 1:
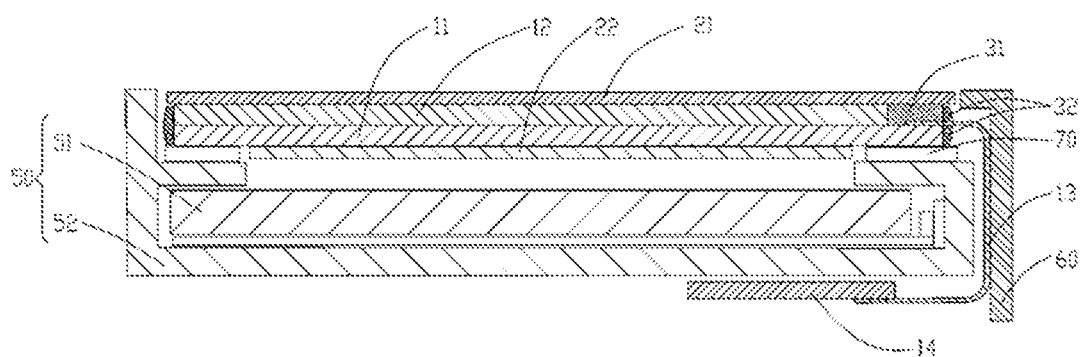
FIG. 1 shows a cross-sectional schematic view of a display panel according to a first embodiment of the disclosure.
Figure 2:
FIG. 2 shows a cross-sectional schematic view of the display panel in an initial state according to the first embodiment of the disclosure.
Figure 3:
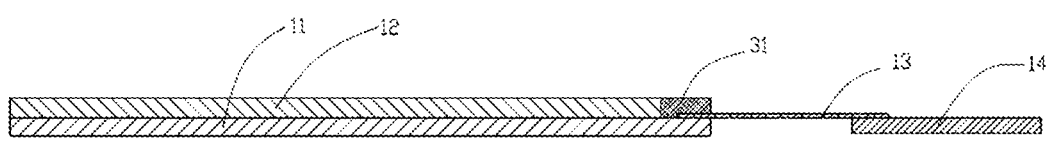
FIG. 3 shows a cross-sectional schematic view of the display panel after processed with a first sealing adhesive according to the first embodiment of the disclosure.
Figure 4:
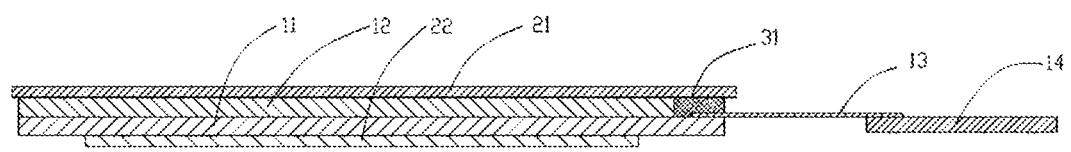
FIG. 4 shows a cross-sectional schematic view of the display panel after attaching a first polarizer and a second polarizer according to the first embodiment of the disclosure.

11: array substrate; 111: binding region; 12: color film substrate; 13: flexible circuit board; 14: mainboard;
21: first polarizer; 22: second polarizer;
31: first sealing adhesive; 311: auxiliary adhesive layer; 312: main body layer; 313: plane layer; 32: second sealing adhesive; 321: patch layer; 322: sealing layer; 323: buffer layer;
41: adhesive block strip; 42: scraper; 43: adhesive applying device;
50: backlight module;
51: backlight light source; 52: installation bracket;
60: front frame;
70: black foam adhesive.

DETAILED DESCRIPTION

Hereinafter, features and exemplary embodiments according to various aspects of the disclosure will be described in detail. Specific details are given in the description in detail as follows to provide a thorough understanding of the disclosure. However, it is apparent to those skilled in the art that the disclosure may be practiced without some of the specific details. The following description of the embodiments is only intended to provide a better understanding of the disclosure by showing examples of the disclosure. In the drawings and the following description, at least some well-known structures and techniques are not to be shown in order to avoid unnecessarily obscuring the disclosure; dimensions of some structures may be exaggerated for clarity. Further, features, structures, or characteristics to be described hereinafter may be combined in one or more embodiments in any suitable manner.

First Embodiment

Referring to FIG. 1, a first embodiment of the disclosure provides a display panel, comprising: an array substrate 11 and a color film substrate 12 that are disposed opposite, and a first polarizer 21 on a side of the color film substrate 12 away from the array substrate 11, the array substrate 11 comprises a display region and a binding region 111 on a side of the display region, the binding region 111 is electrically connected to a mainboard 14 through a flexible circuit board 13, and an orthographic projection of the color film substrate 12 on the array substrate 11 does not overlap with the binding region 111. The display panel further comprises a first sealing adhesive 31 that fills between the binding region 111 and the first polarizer 21 and covers an end of the flexible circuit board 13 away from the mainboard 14, wherein an area of an orthographic projection of the first polarizer 21 on the array substrate 11 is larger than an area of the array substrate 11.

Referring to FIG. 1, in a technical solution of the first embodiment, the binding region 111 can be covered by setting the first sealing adhesive 31, and the binding region 111 is brought under the first polarizer 21, so that the binding region 111 is covered by the first polarizer 21 and the first sealing adhesive 31 can effectively prevent light leakage. Therefore, problems in the related art are effectively solved, comprising a wide frame of a fourth side of a display panel, which is caused by that a binding region is required to be covered by a decorative member, and a lack of a real frameless effect due to a protruding frame. The color film substrate 12 is bonded based on the array substrate 11. When formed as a solid, the first sealing adhesive 31 can also form a bond with the array substrate 11 and the color film substrate 12 through own properties, thereby further ensuring a stable connection between the array substrate 11 and the color film substrate 12.

It should be noted that in the technical solution of the first embodiment, a liquid crystal layer is disposed between the array substrate 11 and the color film substrate 12. The liquid crystal layer contains several liquid crystal molecules, which usually have a rod shape and can flow like liquid and have some characteristics of crystals. When the liquid crystal molecules are in an electric field, an alignment direction thereof changes with a change of the electric field.

Referring to FIG. 1, in the technical solution of the first embodiment, outer peripheral sides of the array substrate 11 and the color film substrate 12 are also provided with a second sealing adhesive 32, and a peripheral edge of the first polarizer 21 is aligned with a peripheral edge of the second sealing adhesive 32. The second sealing adhesive 32 surrounds the array substrate 11 and the color film substrate 12, so that sides of the array substrate 11 and the color film substrate 12 can be prevented from entering dust or moisture, which affects a function of the liquid crystal layer, and a service life of the display panel can be improved.

It should be noted that in the technical solution of the first embodiment, when the second sealing adhesive 32 is applied, a region close to the array substrate 11 and the color film substrate 12 has a large coating thickness and a formed adhesive film has a large thickness, so that an adhesive effect at adhesion of each sealing adhesive layer can be ensured while further improving sealing performance.

In the technical solution of the first embodiment, the first sealing adhesive 31 and the second sealing adhesive 32 are any one of an ultraviolet curing adhesive, tuffy adhesive and silica gel respectively. The first sealing adhesive 31 or the second sealing adhesive 32 formed by using the above materials has good resistance performance, and is suitable for the inside of the display panel to form a certain protective barrier. Meanwhile, both sealing adhesives have good flow performance before being formed as sealing colloid, can be formed as a shape type as required, and are more suitable for smaller space scenes. In the embodiment, the first sealing adhesive 31 and the second sealing adhesive 32 can be scraped off or pressed by a certain means before being formed as fixed colloid, so that the first sealing adhesive 31 can be aligned with a surface of the color film substrate 12 away from the array substrate 11.

In the technical solution of the first embodiment, the first sealing adhesive 31 and the second sealing adhesive 32 are a black adhesive doped with microparticles. The black adhesive can prevent light leakage, and the doped microparticles facilitate adjusting fluidity of the sealing adhesives during solidification and adjusting a solidification time of the sealing adhesives. Proper fluidity facilitates processing of colloid formation, and a proper solidification time can effectively save process time and improve production efficiency while ensuring production quality.

In the technical solution of the first embodiment, the microparticles are porous silica bead particles. The porous silica bead particles can effectively reduce the solidification time, and can increase stability and strength of the colloid after solidification.

Second Embodiment

Referring to FIGS. 2 to 8, based on the first embodiment, a second embodiment of the disclosure also provides a method of manufacturing a display panel. The display panel is the display panel in the first embodiment. The method of manufacturing the display panel comprises: aligning the array substrate 11 with the color film substrate 12 and performing bonding operation in the binding region 111 of the array substrate 11 in order to electrically connect the binding region 111 to the mainboard 14 through the flexible circuit board 13. Specifically, a liquid crystal layer is located between the array substrate 11 and the color film substrate 12 in the alignment process. The binding region 111 is coated with the first sealing adhesive 31, and the first sealing adhesive 31 covers an end of the flexible circuit board 13 away from the mainboard 14. Specifically, one side of the color film substrate 12 close to the binding region 111 is electrically connected to the flexible circuit board 13 of the binding region 111, and then the first sealing adhesive 31 is applied to seal the binding region 111 inside. The first polarizer 21 is attached to the color film substrate 12 and the first sealing adhesive 31 to form a semi-finished product, and an area of an orthographic projection of the first polarizer 21 on the array substrate 11 is larger than an area of the array substrate 11. Specifically, after the attachment of the first polarizer 21 and the color film substrate 12 and the attachment of the first polarizer 21 and the first sealing adhesive 31, an edge of the first polarizer 21 is formed as a lateral region to facilitate subsequent processing. In a technical solution of the disclosure, the display panel is required to be installed in a preset installation cavity, and the edge around the first polarizer 21 can be installed in a matching manner with the installation cavity.

Figure 7:
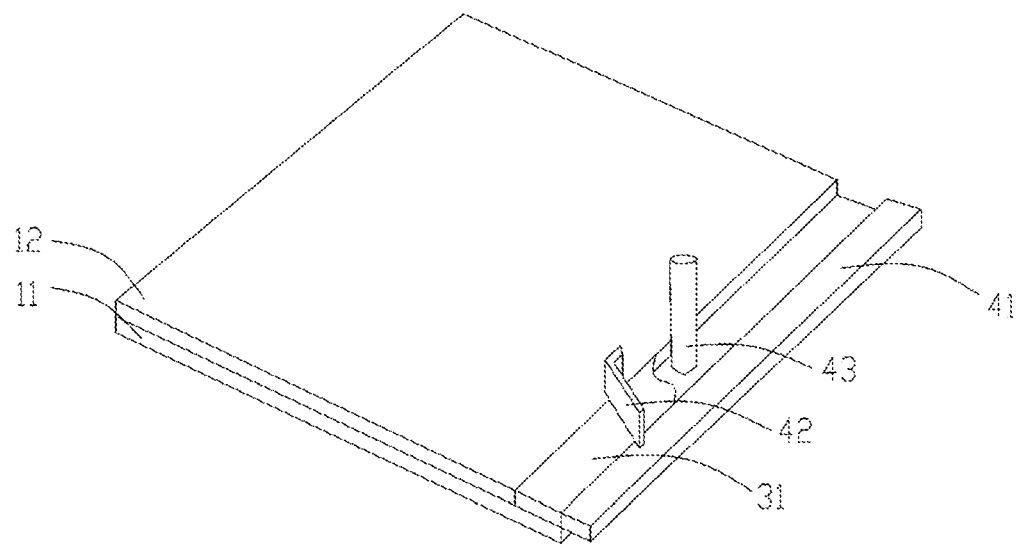
FIG. 7 shows a perspective schematic view of the display panel when processed with the first sealing adhesive according to the first embodiment of the disclosure.
Figure 8:
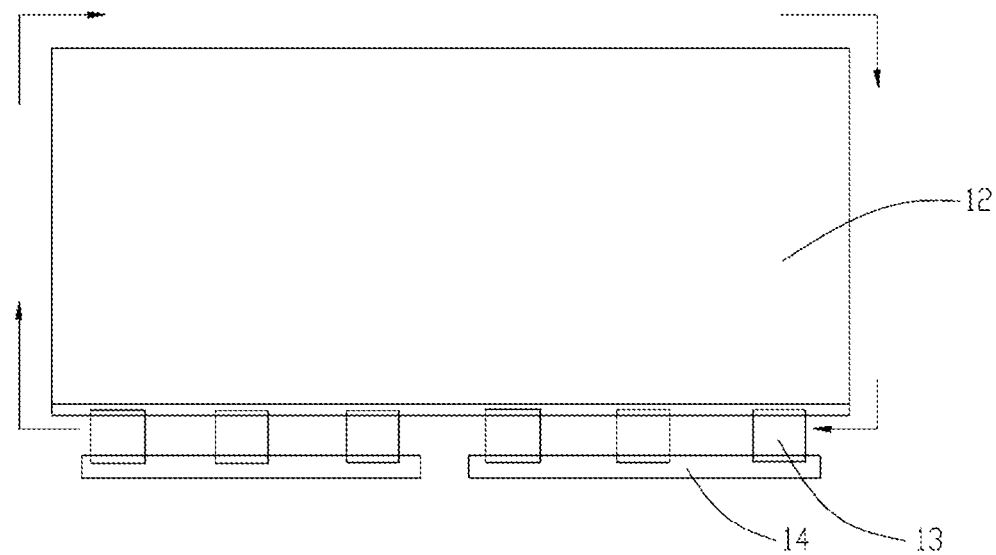
FIG. 8 shows a processing schematic view of the display panel processed with the second sealing adhesive according to the first embodiment of the disclosure.

Referring to FIG. 7, in a technical solution of the second embodiment, applying the first sealing adhesive 31 to the binding region 111 comprises: disposing an adhesive block strip 41 on an end face of the array substrate 11 corresponding to the binding region 111, and aligning an upper surface of the adhesive block strip 41 with the color film substrate 12. Specifically, the adhesive block strip 41 is disposed to form a housing groove of the first sealing adhesive 31 with the color film substrate 12 and the array substrate 11, and then a liquid sealing adhesive is squeezed into the housing groove to form the first sealing adhesive 31 in a fixed shape.

Referring to FIG. 7, in the technical solution of the second embodiment, the first sealing adhesive 31 is applied from a first end to a second end of the binding region 111 with an adhesive applying device 43, and meanwhile surfaces of the color film substrate 12 and the adhesive block strip 41 are pressed with a scraper 42 to scrape off the first sealing adhesive 31 following the adhesive applying device 43. Specifically, the scraper 42 is provided with an adhesive scraping surface and a side baffle surface. The side baffle surface is parallel to a moving direction and is located on one side of the color film substrate 12, while an angle between the adhesive scraping surface and the moving direction is greater than 90°, and an end of the adhesive scraping surface is located on the adhesive block strip 41. In a best embodiment, the side baffle surface is aligned with the side of the color film substrate 12, so that liquid colloid can be prevented from adhering to the color film substrate 12, and excessive colloid can be guided to the adhesive scraping surface at the same time after a scraping movement starts. The adhesive scraping surface can push the colloid from the color film substrate 12 to the adhesive block strip 41 by the angle setting, and shapes the colloid to form a surface parallel to an upper surface of the color film substrate 12 in order to facilitate subsequent adhesion of the first polarizer 21. It should be noted that when the colloid solidifies and shrinks, the colloid is replenished for a second time to ensure that an upper surface of the first sealing adhesive 31 is aligned with the upper surface of the color film substrate 12.

Figure 5:
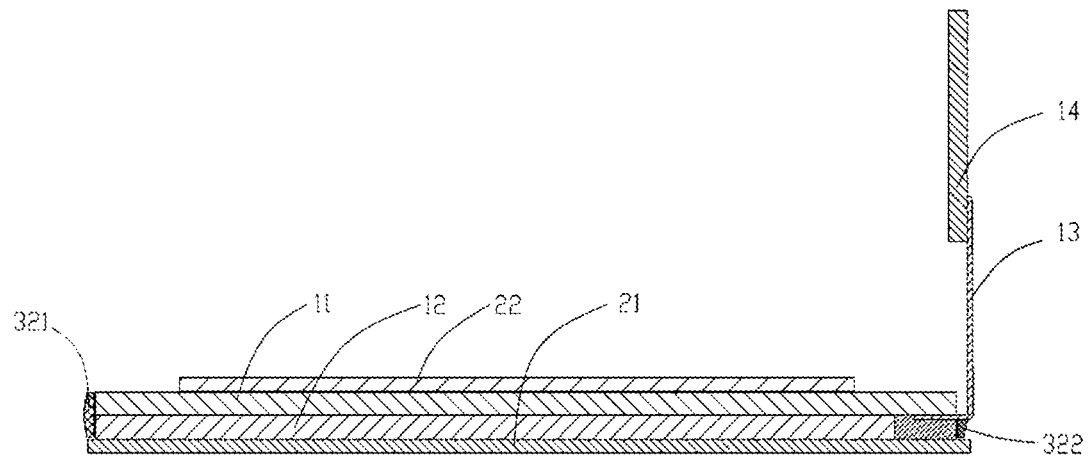
FIG. 5 shows a cross-sectional schematic view of the display panel when processed with a second sealing adhesive according to the first embodiment of the disclosure.
Figure 6:
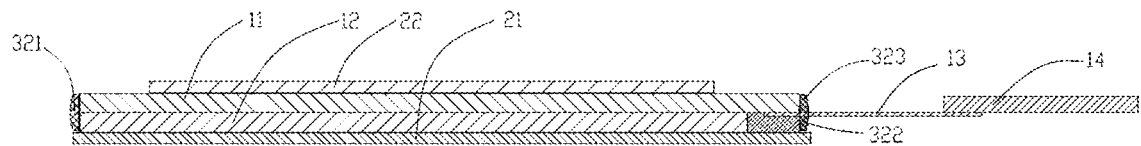
FIG. 6 shows a cross-sectional schematic view of the display panel after processed with the second sealing adhesive according to the first embodiment of the disclosure.

Referring to FIGS. 5 and 6, the technical solution of the second embodiment also comprises: inverting the semi-finished product so that the first polarizer 21 is in contact with a placement face, the first polarizer 21 at the bottom can facilitate application of the second sealing adhesive 32 to a lateral side; and applying the second sealing adhesive 32 to outer peripheral sides of the array substrate 11 and the color film substrate 12, and aligning a peripheral edge of the first polarizer 21 with a peripheral edge of the second sealing adhesive 32.

Referring to FIGS. 5 and 6, in the technical solution of the second embodiment, applying the second sealing adhesive 32 to outer peripheral sides of the array substrate 11 and the color film substrate 12 comprises: fixing the flexible circuit board 13 to be perpendicular to the placement face; applying the second sealing adhesive 32 to side end faces of the array substrate 11 and the color film substrate 12 corresponding to the binding region 111 from the first end along a preset direction with the adhesive applying device 43; when the adhesive applying device 43 reaches the second end of the binding region 111, and applying the second sealing adhesive 32 to the side end face of the color film substrate corresponding to the binding region from the second end around the outer peripheral side of the color film substrate 12 along the preset direction; and placing the flexible circuit board 13 in parallel with the placement face, and applying an adhesive to the side end face of the array substrate 11 corresponding to the binding region 111 from the first end to the second end with the adhesive applying device 43 for a second time.

In the second embodiment, the second sealing adhesive 32 is a single-layer adhesive. An adhesive applying route is as follows. First, from one side of the flexible circuit board 13 toward a direction away from the flexible circuit board 13, the second sealing adhesive 32 is applied around the sides of the array substrate 11 and the color film substrate 12, and an endpoint of coating is set at a second side of the flexible circuit board 13. Then, the flexible circuit board 13 is bent to a side away from the first polarizer 21 to expose a region between the first polarizer 21 and the flexible circuit board 13. At this time, the region is coated with the second sealing adhesive 32, and the coating needs to be connected to the second sealing adhesive 32 on both sides of the flexible circuit board 13. After that, the flexible circuit board 13 is restored to a straight-line shape. At this time, a region between the flexible circuit board 13 and the color film substrate 12 is coated with the second sealing adhesive 32. Since there are gaps between lines of the flexible circuit board 13, when this region is coated with the second sealing adhesive 32, the coating needs to be connected to the second sealing adhesive 32 at the gaps and also needs to be connected to the second sealing adhesive 32 on both sides of the flexible circuit board 13. Such a coating method can make the second sealing adhesive 32 fully adhere to sides of the display panel, and the formed connections can completely seal the sides of the display panel at the same time in order to form an effective seal. Moreover, positions at adhesion are not set at sharp corners of the display panel, so that a risk of colloid crack and breakage can be prevented, and sealing performance and a service life of the colloid can be improved.

Third Embodiment

Figure 9:
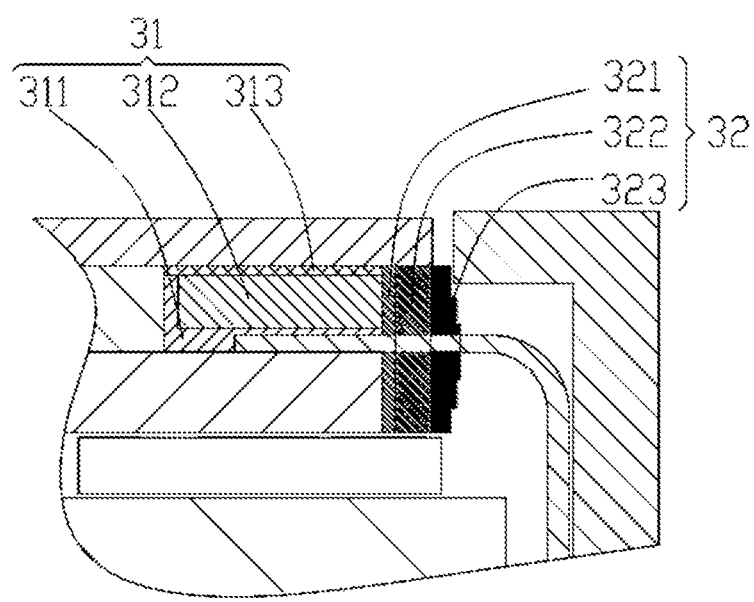
FIG. 9 shows a schematic view of a partial structure of a display panel according to a third embodiment of the disclosure.

Referring to FIG. 9, based on the first embodiment, the third embodiment of the disclosure provides a display panel. The second sealing adhesive 32 set at a corresponding side of the binding region 111 comprises a patch layer 321, a sealing layer 322 and a buffer layer 323 that are sequentially disposed. The patch layer 321 is in contact with the first polarizer 21, the first sealing adhesive 31 and the array substrate 11, the sealing layer 322 is disposed between the first polarizer 21 and the array substrate 11, and the buffer layer 323 is in contact with a front frame 60. Specifically, the patch layer 321 is respectively bonded to the first sealing adhesive 31 and the array substrate 11. The patch layer 321 has a small thickness, and is mainly used to fill unevenness of the first sealing adhesive 31 and gaps between the first sealing adhesive 31 and a lateral side of the array substrate 11 in order to initially guarantee sealing performance of the display panel. The sealing layer 322 has a relatively large thickness. On the premise of ensured bonding performance, coating with a thickened colloid ensures that there is no gap in the display panel and further ensures the sealing performance of the display panel. At the same time, both ends of the sealing layer 322 adhere to the front frame 60 and a frame through own viscosity, thereby ensuring the sealing performance and stability of the display panel during assembly. The buffer layer 323 is used to connect the sealing layer 322 and the front frame 60. On the premise of ensured adhesion with the front frame 60, the buffer layer 323 also has good buffer performance. The formed colloid has a certain elastic deformation capacity, which can effectively resist part of an acting force in order to protect the display panel from damage.

It should be noted that in a technical solution of the third embodiment, the patch layer 321, the sealing layer 322 and the buffer layer 323 can use the same material for coating. This brings advantages that the same coating material enables stronger adhesion between the layers during coating, and that materials can fuse together at the same time, so that harmful factors such as bubbles and gaps due to divided layers are avoided without affecting a service life of the display panel, and production efficiency can be improved since the same material does not need to be replaced during operation.

Referring to FIG. 9, in the technical solution of the third embodiment, the first sealing adhesive 31 can be formed by coating of three adhesive layers. The first adhesive layer is an auxiliary adhesive layer 311, which is used to coat and level a region of the flexible circuit board 13, bond the color film substrate 12, and coat a gap between the color film substrate 12 and the array substrate 11 in order to increase sealing performance at the gap. The second adhesive layer is a main body layer 312, which is used to fill a main binding region. The third adhesive layer is a plane layer 313, which is used to coat and level the main body layer 312. A coating process of the plane layer 313 can be divided into several times. Since the colloid shrinks during solidification of the adhesive, gaps and bubbles and the like that appear need to be filled so as to ensure that a top of the first sealing adhesive 31 can be aligned with the color film substrate 12 without bubbles or the like. Such a setting can also improve bonding stability of the first polarizer 21. It should be noted that in the technical solution of the third embodiment, coating materials used for the adhesive layers of the first sealing adhesive 31 are different. The auxiliary adhesive layer 311 can be filled with an adhesive having strong fluidity to ensure that no small bubbles or gaps appear after coating. The main body layer 312 can be filled with an adhesive having a small solidification shrinkage amount to ensure that no large amount of filling work is required after solidification. The plane layer 313 can be filled with an adhesive having good adhesion, which can ensure a bonding effect when bonded to the first polarizer 21.

It should be noted that in the third embodiment, number of layers of the first sealing adhesive 31 and the second sealing adhesive 32 are not limited to be specific, and layers of the second sealing adhesive 32 on the other three sides are not limited to be specific. A process design of production can be performed on the adhesive layers according to practical requirements. The auxiliary adhesive layer 311 in the first sealing adhesive 31 is bonded to a junction of the color film substrate 12 and the array substrate 11 to form an effective seal. A top of the auxiliary adhesive layer 311 and a top of the main body layer 312 are roughly aligned to facilitate coating of the plane layer 313. In the second sealing adhesive 32, the buffer layer 323 is disposed outward in a horizontal direction. To facilitate load bearing and elastic deformation, a side facing the front frame 60 has a stepwise shape that can act as a buffer, and can be brought in contact with a corner of the front frame 60 through the stepwise shape. That is, the buffer layer 323 has two surfaces in contact with the front frame 60 and contact surfaces are parallel to each other, so that adhesion performance between the front frame 60 and the buffer layer 323 can be improved. On the premise of ensured viscosity and sealing performance of the second sealing adhesive 32, in some embodiments, the patch layer 321, the sealing layer 322 and the buffer layer 323 in the second sealing adhesive 32 can also be coated with different materials. Specifically, the patch layer 321 can be coated with an adhesive having strong fluidity, so that the patch layer 321 can be quickly brought in contact with and attached to a contact surface such as the first polarizer 21. The sealing layer 322 can use a sealing adhesive having a small solidification shrinkage amount to facilitate small shrinkage after solidification and provide a suitable coating region for subsequent coating of the buffer layer 323. The buffer layer 323 can use a sealing adhesive having a good elastic deformation amount after solidification to protect the display panel after installation.

Fourth Embodiment

Based on the third embodiment, a fourth embodiment of the disclosure provides a method for forming the first sealing adhesive 31 and the second sealing adhesive 32 of a display panel. First, the first sealing adhesive 31 is applied. The adhesive block strip 41 is disposed on an end face of the array substrate 11 corresponding to the binding region 111, and an upper surface of the adhesive block strip 41 is aligned with the color film substrate 12; when the auxiliary adhesive layer 311 is applied, a region of the flexible circuit board 13 in the binding region 111 is coated and positioned below the auxiliary adhesive layer 311. Then, the main body layer 312 is applied. A sealing adhesive with less solidification shrinkage is applied to the auxiliary adhesive layer 311 and is firmly bonded to the auxiliary adhesive layer 311. After solidification, the plane layer 313 is applied. To coat the plane layer 313, it is required to coat and level bubbles and gaps. Finally, after the plane layer 313 is completely aligned with the color film substrate 12, the first polarizer 21 is installed.

After the installation of the first polarizer 21 is completed, the display panel is inverted, so that the first polarizer 21 is located below. Then, the second sealing adhesive 32 is applied. First, the flexible circuit board 13 is fixed to be perpendicular to a placement face; side end faces of the array substrate 11 and the color film substrate 12 corresponding to the binding region 111 are coated with the second sealing adhesive 32 from a first end along a preset direction with the adhesive applying device 43. Here, the second sealing adhesive 32 mainly corresponds to other sides except the binding region 111, and is used for sealing between the color film substrate 12 and the array substrate 11. After application of the second sealing adhesive 32 to other sides, the side end face of the color film substrate 12 corresponding to the binding region 111 is coated with the second sealing adhesive 32, and a coating material is replaced with a coating material of the patch layer 321. Then, the flexible circuit board 13 is bent to a side away from the first polarizer 21 to expose a region between the first polarizer 21 and the flexible circuit board 13. At this time, the region is coated with the patch layer 321, and the coating needs to be connected to the second sealing adhesive 32 on both sides of the flexible circuit board 13. After that, the flexible circuit board 13 is restored to a straight-line shape. At this time, a region between the flexible circuit board 13 and the color film substrate 12 is coated with the patch layer 321. Since there are gaps between lines of the flexible circuit board 13, when this region is coated with the patch layer 321, the coating needs to be connected to the patch layer 321 at the gaps and also needs to be connected to the second sealing adhesive 32 on both sides of the flexible circuit board 13. After the application of the patch layer 321 is completed, the sealing layer 322 and the buffer layer 323 are applied using the same method. Such a coating method can ensure sealing performance of the display panel, and multi-layer coating can process the gaps more carefully, can strictly handle quality problems such as bubbles, and can improve product quality.

Fifth Embodiment

A technical solution of the disclosure also provides a method for forming the first sealing adhesive 31 and the second sealing adhesive 32. Specifically, after alignment (i.e., vacuum bonding of two substrates) of the color film substrate 12 with the array substrate 11 is completed, a circuit is bound, and then the binding region 111 is filled with an adhesive. First, an adhesive block strip 41 is disposed on an end face of the array substrate 11, and an upper surface of the adhesive block strip 41 coincides with a surface of the color film substrate 12 so as to limit a width and a thickness of the first sealing adhesive 31 after solidification. Then, the adhesive applying device 43 starts applying an adhesive from one end to the other end to fill the set binding region 111. At the same time, surfaces of the color film substrate 12 and the adhesive block strip 41 are pressed with the scraper 42 to scrape off the first sealing adhesive 31 following the adhesive applying device 43. The sealing adhesive may be an ultraviolet adhesive, tuffy adhesive or silica gel, and is preferably black to reduce a light transmissive property of a binding region. The sealing adhesive is doped with microparticles, which reduce fluidity after coating, facilitate solidification and formation, and improve supporting performance after solidification. The microparticles are preferably porous silica bead particles. The scraper 42 is provided with an adhesive scraping surface and a side baffle surface. The side baffle surface is parallel to a moving direction while an angle between the adhesive scraping surface and the moving direction is greater than 90°, so that excessive sealing adhesive can be guided to the adhesive block strip 41 for removal.

Surfaces of the color film substrate 12 and the array substrate 11 filled with an adhesive are completely flat, and the first polarizer 21 and the second polarizer 22 are respectively attached to the color film substrate 12 and the array substrate 11. The first polarizer 21 is attached beyond the color film substrate 12. The first polarizer 21 is placed downward, the flexible circuit board 13 is fixed to be perpendicular to a placement face, and the adhesive applying device 43 is used to apply an adhesive to a common side of the color film substrate 12 and the array substrate 11. A starting point of an adhesive applying route is set next to a leftmost drive line. An adhesive is applied to the color film substrate 12 and the array substrate 11 in a clockwise direction. When a coating head moves to a rightmost drive line, an adhesive applying amount is adjusted, and an adhesive is only applied to a side of the color film substrate 12 in a section from the rightmost drive line to the leftmost drive line. Then, the drive lines are horizontally placed, and the coating head is used to apply an adhesive to the array substrate 11 in a section from the leftmost drive line to the rightmost drive line for a second time so as to complete whole side adhesive applying on the four sides. With a starting position not located at four corners and an overall design of adhesive applying on lateral sides, the side adhesive is not easy to crack under force even under an action of high and low temperatures. In the technical solution of a fifth embodiment, the binding region is filled with an adhesive by designing an adhesive applying method, and an extension surface is formed in the binding region, so that a whole side of a polarizer is enabled to be attached. After that, side adhesive applying is performed on the four sides through the polarizer to form a four-side frameless display device. Doped microparticles in the sealing adhesive reduce the fluidity after coating, accelerate a solidification speed of the sealing adhesive, and improve supporting performance of the sealing adhesive on the polarizer after solidification. The side adhesive applying is performed on the four sides through the polarizer to integrate the four sides, improve overall strength of the adhesive applying, and avoid a crack in the adhesive. The whole side of the polarizer is attached to sides, and a visual effect of the display device is improved without a need for light blocking with a front frame and decoration.

Based on the first embodiment, the disclosure provides a display device comprising: a display panel and a backlight module 50, in which the backlight module 50 is provided on a backlight side of the display panel and configured to provide a light source for the display panel, the flexible circuit board 13 and the mainboard 14 are bent from an end of the display panel to a backlight surface of the backlight module 50; and a front frame 60 provided on sides of the display panel and the backlight module 50 and covering the flexible circuit board 13, in which the front frame 60 does not overlap with the first polarizer 21 of the display panel. A black foam adhesive 70 is disposed between the backlight module 50 and the display panel, and has a certain bonding function and a light-leakage-proof function. Specifically, the backlight module 50 comprises a backlight light source 51 and an installation bracket 52. The installation bracket 52 is provided with an installation cavity of the backlight light source 51. A light through hole is formed through brackets at both ends above the installation cavity of the installation bracket 52. The brackets at both ends are used to install the black foam adhesive 70 and the display panel. A part of the array substrate 11 outside the second polarizer 22 in the display panel is bonded to the black foam adhesive 70. Except one side at the binding region 111, the other three sides of the installation bracket 52 are provided with vertical housing walls, with which the display panel can be surrounded by an internal region formed by the housing walls. At the same time, gaps between the housing walls and the first polarizer 21 are small, and thus a frameless requirement can be met. The front frame 60 is disposed at one side of the binding region 111, and comprises a vertical sidewall and a crossbar having the same thickness as that of the housing walls. The crossbar is perpendicular to the vertical sidewall. The crossbar has an end face on the same plane as that of each housing wall, and the end face is aligned with or slightly higher than an upper surface of the first polarizer 21 so as to achieve an optimal frameless effect. The crossbar is disposed to block a part that cannot be covered by a bending region of the flexible circuit board and a partial region of the installation bracket at the bottom. The crossbar disposed in the front frame allows the front frame to have a turning, so that light leakage can be further avoided. Since the first sealing adhesive 31 is provided, a length of the crossbar is greatly reduced compared with the related art. A fourth side of the display panel can present an extremely narrow visual effect, which greatly improves visual experience of a user.

It should be noted that since the display panel is a non-emissive light-receiving element, the light source needs to be provided by the backlight module disposed on one side of the backlight surface. The array substrate 11 comprises a plurality of pixel electrodes, and the color film substrate 12 comprises a common electrode. The display panel controls rotation of liquid crystal molecules of a liquid crystal layer by applying a drive voltage on the pixel electrodes and the common electrode so as to refract light provided by the backlight module and generate a picture. To display color pictures, a thin-film transistor array is usually prepared on the array substrate 11 to drive the rotation of the liquid crystal molecules and control display of each sub-pixel.

It can be understood that the technical solutions of the display panel provided by the embodiments of the disclosure can be widely applied to various display panels, such as Twisted Nematic (TN) display panel, In-Plane Switching (IPS) display panel, Vertical Alignment (VA) display panel, and Multi-Domain Vertical Alignment (MVA) display panel.

It should be easily understood that "on", "upon" and "above" in the disclosure should be interpreted in a broadest manner. Therefore, "on" not only means "directly on something", but also means "on something" with intermediate features or layers therebetween, and "upon" or "above" not only means "upon something" or "above something", but also means "upon something" or "above something" without intermediate features or layers therebetween (i.e., directly on something).

As used herein, the term "layer" may refer to a portion of a material that comprises a region having a certain thickness. A layer may extend over an entire underlying or overlying structure or may have a range smaller than that of the underlying or overlying structure. In addition, the layer may be a region of a uniform or non-uniform continuous structure, and the layer has a thickness less than that of the continuous structure. For example, the layer may be located between top and bottom surfaces of the continuous structure, or between any pair of horizontal planes at the top and bottom surfaces. The layer may extend horizontally, vertically, and/or along a tapered surface. A base substrate may be a layer, may comprise one or more layers therein, and/or may comprise one or more layers located thereon, thereabove and/or therebelow. The layer may comprise a plurality of layers. For example, an interconnect layer may comprise one or more conductors and contact layers (in which contact points, interconnect lines and/or through holes are formed) and one or more dielectric layers.

At last, it should be noted that: the above embodiments are only used for describing the technical solutions of the disclosure, but are not intended to limit the disclosure; although the disclosure is described in detail with reference to the above embodiments, those of ordinary skill in the art will understand that: the technical solutions described in the above embodiments may still be modified, or some or all of the technical features may be equivalently substituted; however, the modifications or the substitutions will not make the essence of the corresponding technical solutions depart from the scope of the technical solutions according to the embodiments of the disclosure.

What is claimed is:

1. A display panel comprising: an array substrate (11) and a color film substrate (12) that are disposed opposite; and a first polarizer (21) on a side of the color film substrate (12) away from the array substrate (11), in which the array substrate (11) comprises a display region and a binding region (111) on a side of the display region, the binding region (111) is electrically connected to a mainboard (14) through a flexible circuit board (13), and an orthographic projection of the color film substrate (12) on the array substrate (11) does not overlap with the binding region (111), wherein the display panel further comprises:
   a first sealing adhesive (31) filled between the binding region (111) and the first polarizer (21) and covering an end of the flexible circuit board (13) away from the mainboard (14), in which an area of an orthographic projection of the first polarizer (21) on the array substrate (11) is larger than an area of the array substrate (11);
   wherein the first sealing adhesive (31) comprises an auxiliary adhesive layer (311), a main body layer (312) and a plane layer (313), and
   wherein the auxiliary adhesive layer (311) covers the flexible circuit board (13), the main body layer (312) fills the binding region (111), and the plane layer (313) covers the main body layer (312).

2. The display panel according to claim 1, wherein the auxiliary adhesive layer (311) is bonded to the color film substrate (12), and the auxiliary adhesive layer (311) is configured to coat a gap between the color film substrate (12) and the array substrate (11).

3. The display panel according to claim 1, wherein outer peripheral sides of the array substrate (11) and the color film substrate (12) are provided with a second sealing adhesive (32), and a peripheral edge of the first polarizer (21) is aligned with a peripheral edge of the second sealing adhesive (32).

4. The display panel according to claim 3, wherein the second sealing adhesive (32) provided on a corresponding side of the binding region (111) comprises a patch layer (321), a sealing layer (322) and a buffer layer (323) that are sequentially disposed, the patch layer (321) is in contact with the first polarizer (21), the first sealing adhesive (31) and the array substrate (11), the sealing layer (322) is disposed between the first polarizer (21) and the array substrate (11), and the buffer layer (323) is in contact with a front frame.

5. The display panel according to claim 4, wherein the patch layer (321), the sealing layer (322) and the buffer layer (323) are made of the same material.

6. The display panel according to claim 3, wherein the first sealing adhesive (31) and the second sealing adhesive (32) are any one of an ultraviolet curing adhesive, tuffy adhesive and silica gel respectively.

7. The display panel according to claim 6, wherein the first sealing adhesive (31) and the second sealing adhesive (32) are a black adhesive doped with microparticles.

8. The display panel according to claim 7, wherein the microparticles are porous silica bead particles.

9. A method of manufacturing a display panel, in which the display panel comprises an array substrate (11) and a color film substrate (12) that are disposed opposite, and a first polarizer (21) on a side of the color film substrate (12) away from the array substrate (11), in which the array substrate (11) comprises a display region and a binding region (111) on a side of the display region, the binding region (111) is electrically connected to a mainboard (14) through a flexible circuit board (13), an orthographic projection of the color film substrate (12) on the array substrate (11) does not overlap with the binding region (111), and the display panel further comprises a first sealing adhesive (31) filled between the binding region (111) and the first polarizer (21) and covering an end of the flexible circuit board (13) away from the mainboard (14), in which an area of an orthographic projection of the first polarizer (21) on the array substrate (11) is larger than an area of the array substrate (11), wherein the first sealing adhesive (31) comprises an auxiliary adhesive layer (311), a main body layer (312) and a plane layer (313), and wherein the auxiliary adhesive layer (311) covers the flexible circuit board (13), the main body layer (312) fills the binding region (111), and the plane layer (313) covers the main body layer (312), the method of manufacturing a display panel comprising:
aligning the array substrate (11) with the color film substrate (12), and performing bonding operation in the binding region (111) in order to electrically connect the binding region (111) to the mainboard (14) through the flexible circuit board (13);
applying the first sealing adhesive (31) to the binding region (111), in which the first sealing adhesive (31) covers the end of the flexible circuit board (13) away from the mainboard (14); and
attaching the first polarizer (21) to the color film substrate (12) and the first sealing adhesive (31) to form a semi-finished product, in which the area of the orthographic projection of the first polarizer (21) on the array substrate (11) is larger than the area of the array substrate (11).

10. The method of manufacturing a display panel according to claim 9, wherein applying the first sealing adhesive (31) to the binding region (111) comprises:
disposing an adhesive block strip (41) on an end face of the array substrate (11) corresponding to the binding region (111), and aligning an upper surface of the adhesive block strip (41) with the color film substrate (12); and
applying the first sealing adhesive (31) from a first end to a second end of the binding region (111) with an adhesive applying device, and meanwhile pressing surfaces of the color film substrate (12) and the adhesive block strip (41) with a scraper (42) to scrape off the first sealing adhesive (31) following the adhesive applying device.

11. The method of manufacturing a display panel according to claim 10, wherein applying the first sealing adhesive (31) comprises:
applying an auxiliary adhesive layer (311) to a region of the flexible circuit board (13) in the binding region (111) such that the flexible circuit board (13) is located below the auxiliary adhesive layer (311);
coating a main body layer (312) such that the main body layer (312) is firmly bonded to the auxiliary adhesive layer (311); and
coating a plane layer (313) after the main body layer (312) is solidified such that the plane layer (313) is completely aligned with the color film substrate (12).

12. The method of manufacturing a display panel according to claim 9, further comprising:
inverting the semi-finished product such that the first polarizer (21) is in contact with a placement face; and
applying a second sealing adhesive (32) to outer peripheral sides of the array substrate (11) and the color film substrate (12), and aligning a peripheral edge of the first polarizer (21) with a peripheral edge of the second sealing adhesive (32).

13. The method of manufacturing a display panel according to claim 12, wherein applying a second sealing adhesive (32) to outer peripheral sides of the array substrate (11) and the color film substrate (12) comprises:
fixing the flexible circuit board (13) to be perpendicular to the placement face;
applying the second sealing adhesive (32) to side end faces of the array substrate (11) and the color film substrate (12) corresponding to the binding region (111) from a first end thereof along a preset direction with an adhesive applying device;
when the adhesive applying device reaches a second end of the binding region (111), adjusting an adhesive applying amount, and applying the second sealing adhesive (32) to the side end face of the color film substrate (12) corresponding to the binding region (111) from the second end around the outer peripheral side of the color film substrate (12) along the preset direction; and
placing the flexible circuit board (13) in parallel with the placement face, and applying an adhesive to the side end face of the array substrate (11) corresponding to the binding region (111) from the first end to the second end with the adhesive applying device for a second time.

14. The method of manufacturing a display panel according to claim 12, wherein the first sealing adhesive (31) and the second sealing adhesive (32) are any one of an ultraviolet curing adhesive, tuffy adhesive and silica gel respectively.

15. The method of manufacturing a display panel according to claim 14, wherein the first sealing adhesive (31) and the second sealing adhesive (32) are a black adhesive doped with microparticles.

16. A display device comprising:
a display panel comprising an array substrate (11) and a color film substrate (12) that are disposed opposite, and a first polarizer (21) on a side of the color film substrate (12) away from the array substrate (11), in which the array substrate (11) comprises a display region and a binding region (111) on a side of the display region, the binding region (111) is electrically connected to a mainboard (14) through a flexible circuit board (13), and an orthographic projection of the color film substrate (12) on the array substrate (11) does not overlap with the binding region (111), the display panel further comprising a first sealing adhesive (31) filled between the binding region (111) and the first polarizer (21) and covering an end of the flexible circuit board (13) away from the mainboard (14), in which an area of an orthographic projection of the first polarizer (21) on the array substrate (11) is larger than an area of the array substrate (11); wherein the first sealing adhesive (31) comprises an auxiliary adhesive layer (311), a main body layer (312) and a plane layer (313), and wherein the auxiliary adhesive layer (311) covers the flexible circuit board (13), the main body layer (312) fills the binding region (111), and the plane layer (313) covers the main body layer (312);

a backlight module (50) provided on a backlight side of the display panel and configured to provide a light source for the display panel, in which the flexible circuit board (13) and the mainboard (14) are bent from an end of the display panel to a backlight surface of the backlight module (50); and a front frame (60) provided on sides of the display panel and the backlight module (50) and covering the flexible circuit board (13), in which the front frame (60) does not overlap with the first polarizer (21) of the display panel.

17. The display device according to claim 16, wherein outer peripheral sides of the array substrate (11) and the color film substrate (12) are provided with a second sealing adhesive (32), and a peripheral edge of the first polarizer (21) is aligned with a peripheral edge of the second sealing adhesive (32).

18. The display device according to claim 17, wherein the second sealing adhesive (32) provided on a corresponding side of the binding region (111) comprises a patch layer (321), a sealing layer (322) and a buffer layer (323) that are sequentially disposed, the patch layer (321) is in contact with the first polarizer (21), the first sealing adhesive (31) and the array substrate (11), the sealing layer (322) is disposed between the first polarizer (21) and the array substrate (11), and the buffer layer (323) is in contact with the front frame (60).

* * * * *